United States Patent [19]

Greendale

[11] 3,968,371
[45] July 6, 1976

[54] METHOD AND APPARATUS FOR DIRECT RADON MEASUREMENT

[75] Inventor: Allen E. Greendale, Brookeville, Md.

[73] Assignee: The United States of America as represented by the Secretary of the Navy, Washington, D.C.

[22] Filed: Sept. 4, 1975

[21] Appl. No.: 610,207

[52] U.S. Cl. .............................. 250/380; 250/255; 250/304; 250/375
[51] Int. Cl.² ............................................. G01T 7/02
[58] Field of Search ........... 250/253, 255, 304, 364, 250/374, 375, 380, 432, 433, 435

[56] References Cited
UNITED STATES PATENTS

| | | | |
|---|---|---|---|
| 3,056,886 | 10/1962 | Glaude et al. | 250/364 |
| 3,084,255 | 4/1963 | Brinkerhoff et al. | 250/380 |
| 3,309,518 | 3/1967 | Weiss | 250/255 X |
| 3,555,278 | 1/1971 | Schroeder | 250/304 |

*Primary Examiner*—Archie R. Borchelt
*Attorney, Agent, or Firm*—R. S. Sciascia; J.A. Cooke; K. K. Yee

[57] ABSTRACT

Radon is directly measured by a portable device which is attached to the wall of a mine or other area from which the gas may be emanating. The radon is collected and directed to an instrument having a gas proportional counter. To prevent build up of radon daughters on the gas proportional counter, with consequent high alpha particle background, a moving film surrounds the counter and carries away the radon daughters.

32 Claims, 5 Drawing Figures

3,968,371

METHOD AND APPARATUS FOR DIRECT RADON MEASUREMENT

BACKGROUND OF THE INVENTION

This invention relates to a method and apparatus for determining the amount of radon in a gaseous sample, and more particularly to the direct on-site collection and measurement of radon emanating, for example, from a mine wall.

Radon is a chemically inert, radioactive, gaseous element produced in the disintegration of radium. In uranium mines, for example, radon emanates from the walls, and once in the air it decays with a 3.8-day half life to polonium-218, which in turn decays to lead-214, bismuth-214, polonium-214 and then to lead-210. These non-gaseous decay products, or daughters, are adsorbed by dust particles in the air. Clearly, excessive amounts of radon present physiological hazards. To reduce this health hazard, a large volume of air is continually forced into the mine to dilute the concentration of radioactive material.

Certain areas in the mine give off more radon than others. To detect these areas of concentration, or hot spots, and to determine the overall level of radon in the mine, a radon measuring device is used. In view of the limited space in a typical mine, a compact, portable radon measuring instrument is desirable. Since radon decays by alpha particle emission, with less than one percent gamma particle emission, an alpha particle detector must be used for the most efficient radon measurement. The high gamma particle background in an uranium mine also makes a gamma particle detector less useful for measuring low levels of radon.

There are a number of problems associated with measuring radon emanating from the wall of a mine. The mine air containing radon must be excluded from the sample taken from the wall. The radon daughters are alpha particle emitters and have to be removed from the sample. Beta particles and gamma radiation from the various radioactive nuclides cannot be allowed to interfere with the radon measurement.

Several types of detectors for alpha particles exist, including scintillant and phototube detectors, solid state detectors, and gas proportional detectors. In the scintillant-and-phototube type of detector, an example of which is described in the patent to Glaude et al, U.S. Pat. No. 3,056,886, a scintillating element, a surface sensitive to alpha particles, is exposed to the atmosphere, the radon content of which is to be determined. The surface emits light scintillations in response to alpha particles. Photomultiplier means, such as a phototube, transforms the scintillations of the detecting surface into detectable electron bursts, and the associated electronic equipment transforms these electron bursts into electric pulses which are counted for a predetermined interval. In a portable instrument the number of phototubes and the power supply are necessarily limited. Also it would be necessary to provide some means to concentrate the radon sample since the planar geometry of the scintillant surface would not be adequate for measuring the radon directly. Any means selected for concentrating the radon must have provisions for removing the radon daughters which build up rapidly and affect the accuracy of the detector. With the plastic scintillantphototube, alpha-type detector, there will be some beta-gamma background, as well as phototube noise, which will raise the sensitivity threshold for radon detection.

The solid-state type of detectors, using small, cryogenicallycooled, solid-state detecting surfaces, present a more serious problem of concentrating the radon-containing gas sample. In a portable solid-state instrument the cryogenic cooling system presents severe size, weight and power requiement problems. Furthermore, the excellent resolution possible with solid-state detectors cannot be fully utilized due to the presence of the radon daughters.

Thus, while many solutions have been proposed for detecting and measuring radon on site, it has not hereto been possible to combine and optimize all of the necessary features for an accurate, quick-responding and portable instrument for on-site radon measurement.

For a portable radon measuring device, the gas proportional detector has a number of advantages over the previously mentioned detectors. The diameter of the counting chamber is limited only by the range of the alpha particle and the length of the counting chamber is limited only by the required portability of the instrument. Thus a counting chamber of sufficient volume to count the radon directly can be of simple design and be of a size and weight below that required for the other types of detectors. At the operating voltage for alpha particles, the proportional detector has an extremely low beta-gamma background and therefore is able to detect radon at lower levels of activity than other known systems. The power supply for the proportional detector is also more stable than that for the scintillant-phototube detector.

SUMMARY OF THE INVENTION

Accordingly, it is an object of the invention to provide an accurate, lightweight and quick responding portable apparatus for the direct, on-site measurement of radon in a gaseous sample.

Another object of the invention is to provide a portable radon measuring apparatus having a novel and unique means to collect a radon-containing gaseous sample.

Another object of the invention is to provide a portable radon measuring apparatus which eliminates the effect of radon daughters upon radon detection and measurement.

Yet another object of the invention is to provide a portable radon measuring apparatus having a novel and unique means for removing radon daughters from the gaseous sample.

Still another object of the invention is the provision of an improved, portable radon measuring apparatus having novel means for continuously removing radon daughters from the gaseous radon sample.

A further object of the invention is the provision of a method for accurately and quickly determining directly the amount of radon in a gaseous sample.

Yet a further object of the invention is to provide a method for measuring radon concentration without concern for the effects of radon daughters.

Still a further object of the invention is to provide a method of collecting a concentrated radon gaseous sample for measurement.

Yet another object of the invention is to provide a method for continuously removing radon daughters from a radon detector.

These and other objects of the invention are attained in a portable apparatus in which a collecting device is attached to the area from which radon-containing gas may be emanating to collect a gaseous sample and direct it to a radon measuring instrument having a gas porportional counter. A moving film surrounds the counter to remove any radon daughters tending to be deposited on the counter.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings wherein:

FIG. 4b is an enlarged, fragmentary, cross-sectional view of the gas proportional counter of FIG. 4a.

DESCRIPTION OF THE PREFERRED EMBODIMENT

Figure 1:
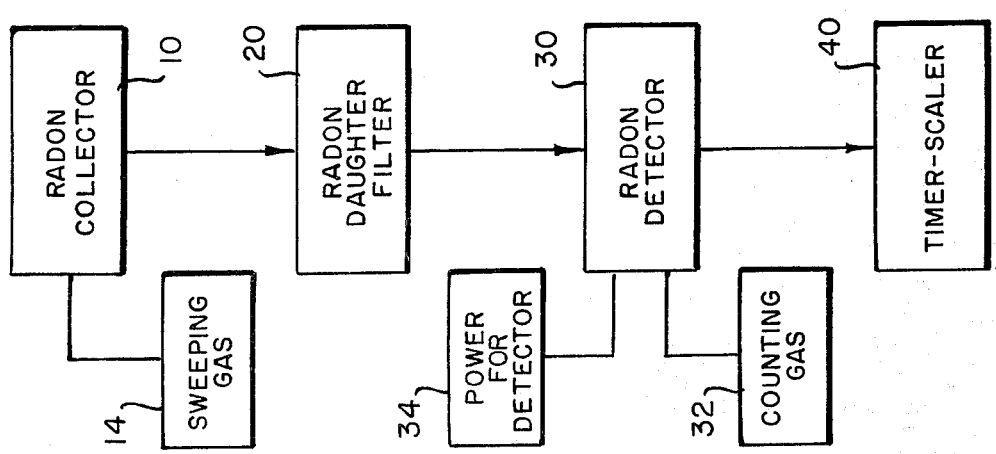
FIG. 1 is a block diagram of the radon direct measuring apparatus of the present invention.

Referring now to the drawings wherein like reference characters designate identical or corresponding parts throughout the several views and more particularly to FIG. 1 thereof, the apparatus of the present invention is illustrated diagrammatically and includes a radon sample collecting device (collector) 10 which is attached to the mine wall to obtain a radon-containing gaseous sample. Connected to the collector 10 is a source of gas 14 which sweeps or forces the radon-containing sample from the collector into the detector 30 via a filter 20 to remove the radon daughters. The filtered radon sample is then introduced into the radon detector 30, which is powered by an energy source 34. A counting gas is supplied to the detector 30 from a gas source 32. Ancillary equipment, such as gas flow meters and power indicators, are known to those skilled in the art and have not been shown in the drawings. The timer-scaler 40 indicates the radon emanation rate.

Figure 2:
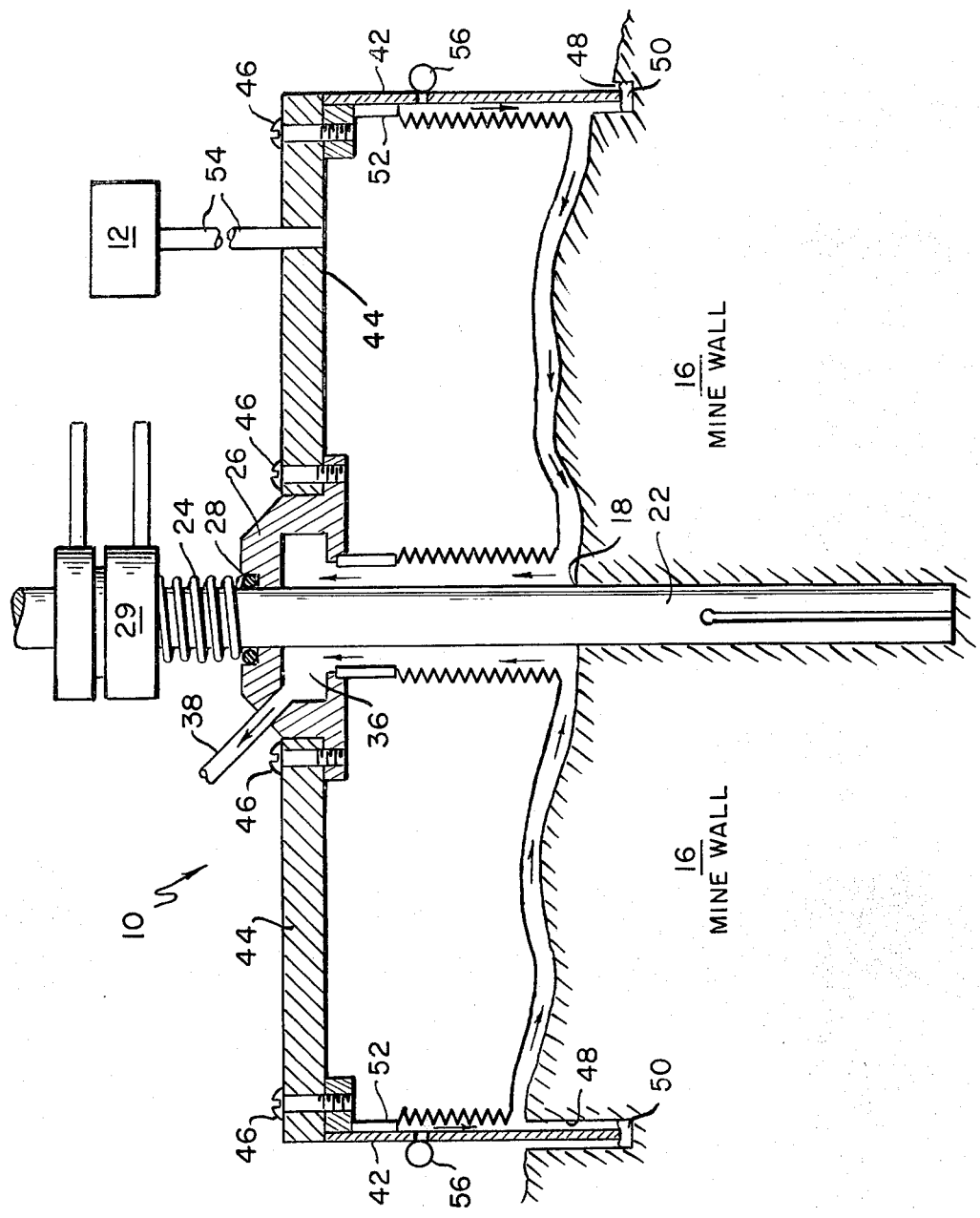
FIG. 2 is a cross-sectional view of a preferred embodiment of the radon collector of the invention as applied to the wall of a mine.

A sectional elevation view of of the radon collector 10 is shown in FIG. 2, attached to the wall 16 of a mine. Mounted in a bore 18 in the wall is an expanding mandrel 22 which serves to support and attach the radon collector 10 to the mine wall 16. Slidably mounted on the exposed portion of the mandrel 22 is a support collar 26 which is appropriately sealed against the mandrel by an O-ring 28. Collar 26 is provided with an internal cavity 36 leading to an exhaust conduit 38, the purpose of which will be described more fully hereinafter. A cylindrical sidewall 42 is attached to a cover plate 44, which in turn is attached to the support collar 26 by suitable fasteners 46. The cover plate 44 may be conveniently fabricated of transparent material to permit observation of the inner volume defined by the sidewall 42. When installed as shown in FIG. 2, the uncovered end of the cylindrical sidewall 42 extends into a groove 48 cut into the mine wall 16 to contact and compress a gasket 50 within the groove. Spring 24, compressed between the locking collet 29 and the support collar 26, presses the sidewall 42 into sealing contact with the gasket 50.

Securely attached by one edge to the support collar 26 and by the other edge to the cover plate 44 is a flexible, inflatable diaphragm 52 which, in the inflated condition of FIG. 2, substantially fills the inner volume defined by the sidewall 42 and in the uninflated state lies adjacent the cover plate 44. The sides of the diaphragm may be pleated to facilitate expansion. Inlet 54 in the cover plate 44 admits gas from the source 12, which may be a squeeze bulb or a gas supply such as compressed $CO_2$ from a bottle, to inflate the diaphragm. With the collector 10 installed and the diaphragm 52 inflated as shown in FIG. 2, a narrow space or volume remains, extending continuously between the sides of the diaphragm and the sidewall 42, between the sides of the diaphragm and the mandrel and between the base of the diaphragm and the surface of the wall 16. Gas, such as $CO_2$, from the source 14 (FIG. 1) is introduced into this volume by means of the ports 56, "sweeping" and carrying the radon emanating from the wall 16 into the cavity 36 and out the conduit 38, as shown by the arrows, to the detector 30 via a flexible coupling. Gas entry ports 56 may conveniently be effected by a tubular conduit extending around the sidewall 42 and feeding into holes or channels provided in the sidewall. To assure a minimum spacing between the base of the inflated diaphragm and the mine wall, a plurality of spacers (not shown) may be attached radially to the diaphragm 52 which will contact the mine wall 16 upon diaphragm inflation. Reduction of the dead air volume in the collector 10 by the diaphragm reduces the time to reach a steady state of radon concentration needed in order to make a measurement.

Figure 3:
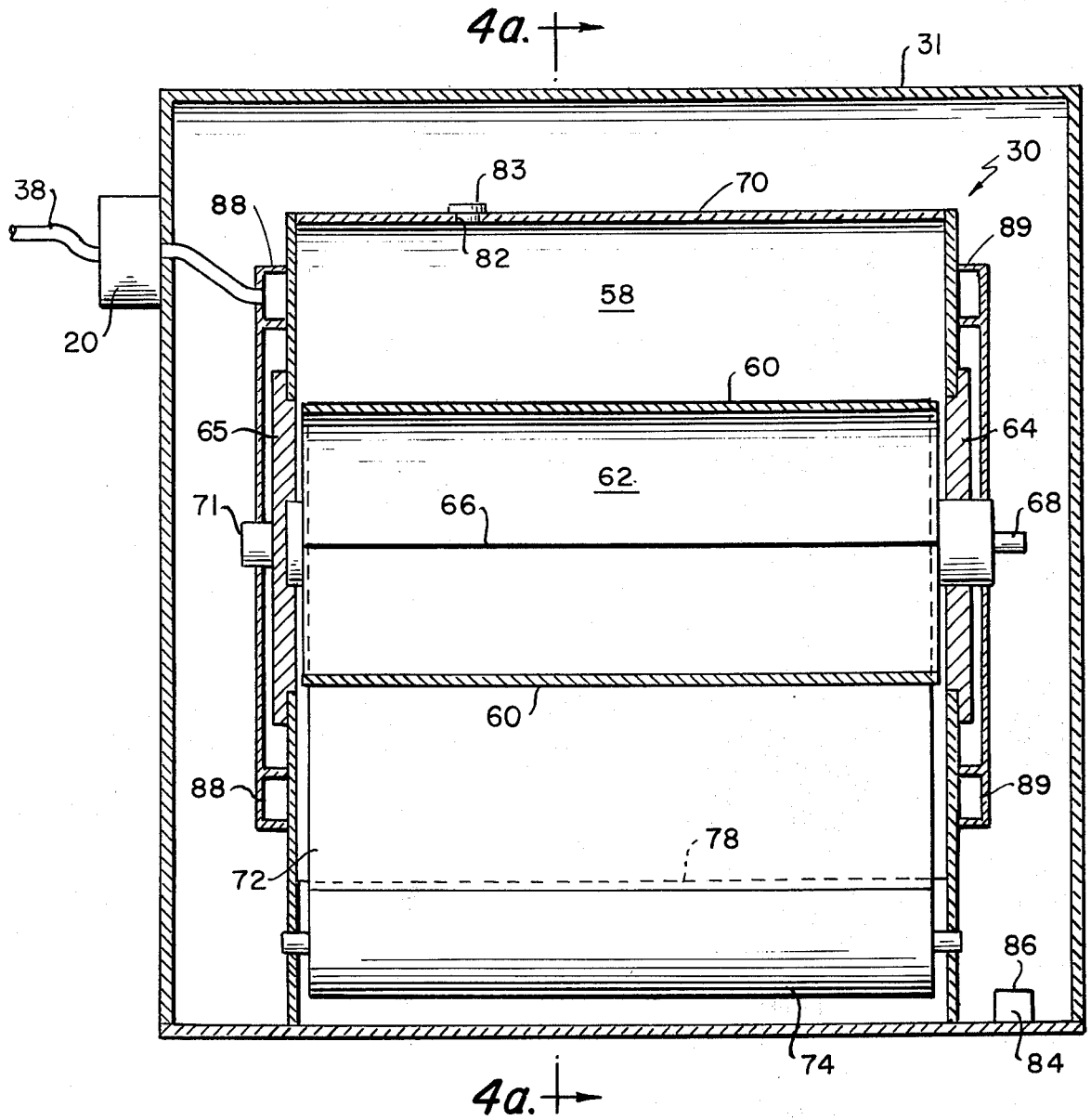
FIG. 3 is a cross-sectional plan view of a preferred embodiment of the radon measuring instrument of the invention.

Shown more fully in the sectional views of FIGS. 3 and 4 is the radon detector contained within the housing 31. Auxiliary and associated equipment have not been shown in FIGS. 3 and 4 to enhance viewing clarity of the detector. The term radon "detector" as used herein refers to an instrument which detects the presence of radon and measures and registers its activity.

Supported on the housing 31 is the radon daughter filter 20, which may be, for example, of the paper element type for filtering particulate matter and is easily replaced. The filter is coupled to the inlet manifold 88 on one end of cylinder 70, which introduces the radon gas sample into the sample chamber 58. An exhaust manifold 89 is secured to the other end of cylinder 70 to exhaust the gas sample outside of the detector housing 31. Manifolds 88 and 89 may be tubular conduits feeding into orifices (not shown) in the ends of the cylinder 70.

A sample chamber 58 for containment of the radon gas while its activity is being measured is defined between an outer cylinder 70 and a concentric perforated cylinder 60. The perforated cylinder 60, covered with a coated film 61 (FIG. 4b) and rotatably supported, has its open ends closed by plugs 64 and 65 to define a fluid-tight, gas proportional counting chamber 62. Cylinder 60 may be suitably formed of such material as metal screen, metal mesh or perforated, metallized plastic, and the film 61, which may be of synthetic resin, is coated with a metallic layer to eliminate the accumulation of a static charge on the detector which may lead to spurious counts. The perforations 63 in the cylinder 60 permit entry of the alpha particles into the counting chamber 62. Dimensions of the cylinders 60 and 70 are appropriately chosen so that the alpha particles from the radon daughters which deposit on the inside surface of the outer cylinder 70 cannot reach the sensitive counting chamber 62. These alpha particles are adsorbed by the radon carrier gas and by the coated film surrounding the perforated cylinder 60, as will be considered more fully herein below.

Supported along the axis of the perforated cylinder 60 by the plugs 64 and 65 is a wire anode 66, supplied with a high voltage from the power source 34 via the connector 68 provided in the plug 64. Plugs 64 and 65 may be made of a suitable dielectric material, such as plastic. The function of the power source 34 is to provide a high voltage to the detector 30 to establish a field gradient within the counting chamber 62. Alpha particles traversing the volume of the chamber in the presence of the counting gas from source 32 collide with the gas molecules, "knocking" electrons therefrom which are subsequently attracted to the anode wire 66 to produce a current impulse. This pulse is detected and registered by the appropriate external circuitry, including a timer-scaler 40 which produces a readout of the radon emanation rate. The scaler counts the current pulses, and the timer registers the time lapse to produce a pulse-per-unit-time readout.

Figure 4B:
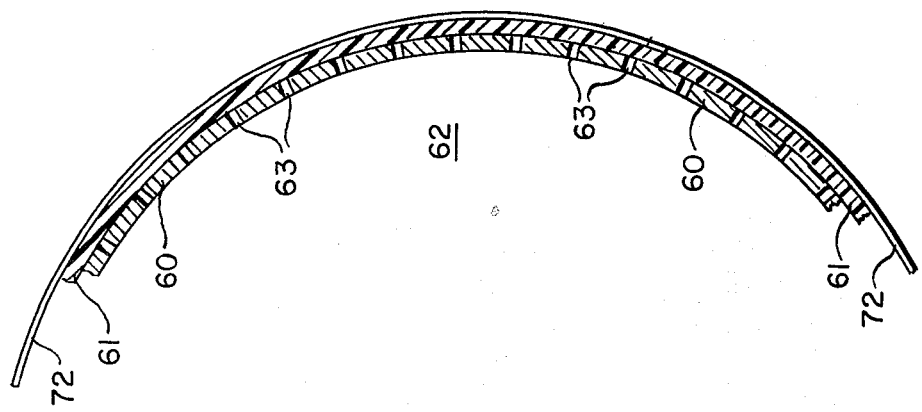
Figure 4A:
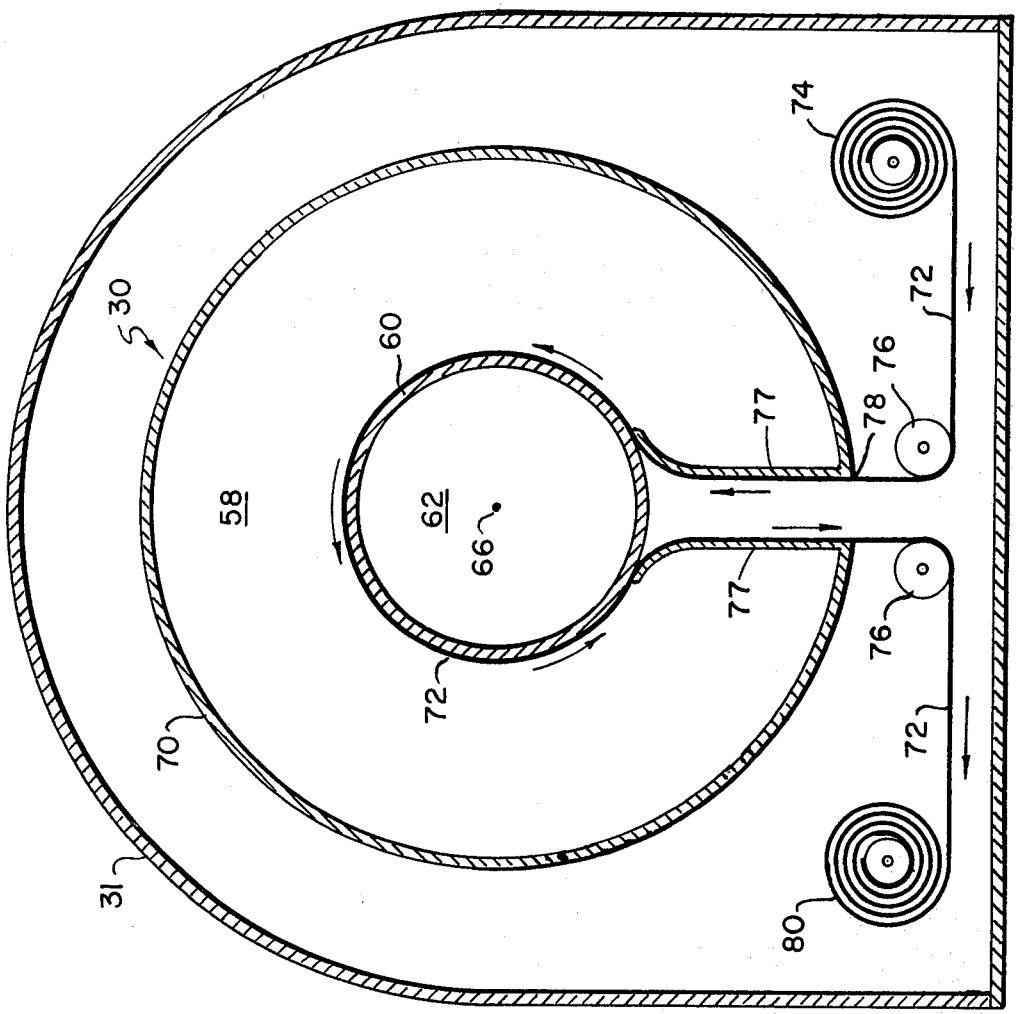
FIG. 4a is a cross-sectional view taken along the line 4—4 of FIG. 3.

A film 72, such as polyethylene terephthalate (Mylar), is unwound from a supply roll 74, passed between a set of guide rollers 76, through a slot 78 in the cylinder 70 to loop over the perforated cylinder 60, out through slot 78 again, and wound upon a take-up spool (note FIGS. 4a and 4b). A pair of guide plates 77 are positioned within the slot 78, spanning the space between the outer cylinder 70 and the perforated cylinder 60 to ensure unencumbered movement of the film. To reduce friction and wear cylinder 60 is rotably mounted, as previously indicated, to rotate with the film 72. To prevent contamination of the coated film 61 covering the perforated cylinder 60, the film 72 is continuously moved over the cylinder 60 whenever the detector 30 is in a radon-contaminated atmosphere. This effectively removes radon daughters which have deposited on the film and continually presents a fresh film surface for the removal of daughters. To achieve this film movement takeup spool 80 may be rotated by any suitable means known in the art, such as a battery-powered electric motor (not shown). Supply roll 74 is removable to permit replacement with a fresh roll of film. Except for polonium-210, which must decay through the 22-year lead -210, the radon daughters have decayed to an insignificant level after one day. The activity from polonium-210 is in the ratio of 3.8 days to 22 years of the amount of radon detected. Thus the same film could be used again the next day with less than 0.05 percent of the original radon alpha activity left on the film. The film could be reused several times until the accumulated activity presents a significant background. Then it should be replaced.

As indicated hereinabove the counting gas provides the source of electrons which are removed by the alpha particles. The counting gas also purges the counting chamber 62 prior to a radon measurement. Counting gas from the source 32 (FIG. 1) is introduced into the counting chamber via an inlet 71 provided in the end plug 65 (FIG. 3) and is exhausted through suitable orifices (not shown) in the end plug 64. Suitable counting gases include methane, propane and P-10, a mixture of 90% argon and 10% methane. P-10 gives a relatively long plateau at approximately half the operating voltage of a single gas. A "plateau" is a relatively constant emanation count rate for a wide variation of voltage applied to the anode 66 in a graph of count rate vs. voltage. With a long, flat plateau, small changes in the voltage will have little effect on the count rate. With the lower voltage, lower background effects can be obtained under conditions of high humidity or in dusty atmospheres since there will be as much electrical leakage as there would be at high voltages. However P-10 and methane are not readily available in containers conveniently useable with a portable instrument. The voltage required for propane is higher than that for the P-10 mixture, but is not excessive for use in a portable field instrument and, while the plateau is not as good as that for P-10 it is adequate. Then, too, since propane is readily available in a convenient form, it is a good candidate as a counting gas.

An opening 82 is provided in the outer cylinder 70 for the insertion of a standard alpha particle source 84 used in the adjustment of the detector 30 prior to radon counting. A fluid-tight cap 83 closes the opening when radon is being measured. An example of a suitable standard alpha particle source is americium-241 since the alpha particles from this material have the same energy as the alpha particles from radon-222. The half-life of americium-241 is 458 years, making it unnecessary to make frequent decay corrections. This source is housed in a gas-tight enclosure 86 within the instrument when it is not in use to protect the source from contamination with lead-210 and the resultant alpha background from polonium-210 when the detector is in radon- contaminated atmosphere.

In calibrating the radon detector, the relationship must be established between the count rate indicated by the detector and the quantity of radon being measured. The detector 30 is adjusted for optimum operating conditions and calibrated against a radon source of known concentration. As an example, a suitable radon source may be made by coprecipitating radium-226 with barium palmitate. A known weight of this precipitate is then packaged in a suitable container which will permit passage of a carrier gas therethrough to sweep the radon into the detector 30. Radon-222 forms when radium decays and is easily swept out of the barium palmitate with a carrier gas such as $CO_2$. The radon is given off at a constant rate, which is directly proportional to the amount of radium present.

The radium concentration may be determined by sealing an aliquot of the barium palmitate-radium precipitate in a capsule, allowing the radium decay products to stabilize and accumulate, and then measuring the gamma activity in an ion chamber. The gamma activity of a radium standard of known concentration, such as those available from the National Bureau of Standards, is then measured in the ion chamber with the same geometry. The gamma activity of the radium standard is then compared with that of the capsule and the amount of radium in the radon source is ratioed from the known quantity of the radium standard. The rate of radon formation is the same as the radium decay.

To adjust the detector for optimum operating conditions, the anode wire 66 is energized by the power source 34 and the sample chamber 58 flushed with sweeping gas from the source 14. Counting gas from the source 32 is then admitted to the counting chamber 62 at a sufficient flow rate to flush out residual oxygen in the chamber. The americium-241 standard radon source 84 is removed from the container 86, inserted into the sample chamber through the opening 82. Emanation rate readings are noted for a range of anode voltages to determine the "plateau." The mean value of anode voltage within this plateau is then selected and the counting gas flow rate is gradually decreased until the count rate is affected. The minimum gas flow rate without count rate variations and the mean plateau anode voltage are then the optimum settings for the detector.

Thus, in calibrating the detector, the instrument is adjusted as indicated above, the americium-241 radon source replaced in the enclosure 86 and the cap 83 replaced. The film drive is turned on to move the film 72 and both the sample chamber and counting chamber are flushed before the sweeping gas is coupled to the container of radium-barium precipitate. The count rate is noted, and since the relationship between the quantity of radium and the weight of precipitate has been previously established, the relationship between the count rate reading and the quantity of radon may be calculated for the sweeping gas flow rate used. Other rates of flow for the sweeping gas will require a recalibration of the instrument.

The gaseous radon-containing sample collector 10 is attached to the mine wall 16 by first drilling the bore 18 to receive the mandrel 22, inserting the mandrel and expanding it sufficiently to secure it in position. Next, groove 48 is cut in the wall 16 with any suitable cutting tool, using the mandrel 22 as a convenient center guide. Gasket 50 is placed into the groove, and collector 10 is placed over the mandrel. Sufficient pressure is applied with spring 24 and locking collet 29 to hold the collector tightly against the wall. Diaphragm 52 is inflated by admitting gas from the source 12 into the inlet 54, its position being visible through the transparent cover plate 44. The outlet 38 leading to the detector 30 is momentarily closed to establish a slight pressure between the diaphragm 52 and the wall so that the seal between the collector and the groove 48 may be checked for leaks. Outlet 38 is reopened and a flow of gas from the source 14 is admitted through the ports 56. The gas "sweeps" out the small volume of mine air trapped between the wall 16 and the diaphragm, passing up through the space around the mandrel, into the cavity 36 and out the outlet 38. The mine air is expelled from the outlet 38, and after the collector 10 has been purged, the outlet conduit 38 is reconnected to the radon detector 30. Since the spacers between the diaphragm 52 and the wall are radially positioned they do not impede the flow of gas toward the space surrounding the mandrel 22.

In operation, the radon collector 10 is attached to the mine wall as set forth above. The detector adjustments are checked with the americium-241 source, as described hereinabove, before connecting it to the collector 10 by means of a suitable conduit between the outlet conduit 38 on the collector and filter 20 on the sample. At all times when the detector 30 is in a radon-contaminated environment, the film 72 is moving over the counting chamber 62 to prevent a deposit of radon daughters which would alter the count. Just before radon emanation readings are made, the sample chamber 58 and the volume between the mine wall 16 and the diaphragm 52 are flushed of mine air with gas from the source 14. Background readings in the detector are taken just after it has been flushed and just after a second flushing following an emanation reading, an average of these two readings are substracted from the emanation rate measurement, and this value is corrected by the calibration factor to determine the radon emanation rate. The radon emanation is indicated in the timer-scaler 40.

The following is an example of the calculation of a radon emanation rate measurement with $CO_2$ as the carrier gas. The detector was calibrated at a $CO_2$ flow rate of 1.05 liters/min. with 9.01 $\mu g$ of $^{226}Ra$ or 1.16 × $10^{-9}$ curie (Ci) of radon. With this radon generator, the count rate was 301 counts/min (c/m). The area of the wall sampled was 14 inches in diameter, or very close to $10^3$ cm$^2$. The volume of gas in the sample chamber of the detector was approximately 3.2 liters. For one count per minute, the radon emanation rate from the wall would be:

$$\frac{1}{301} \times \frac{1.16 \times 10^{-9}}{10^3 \times 3.2 \times 0.6 \times 10^2} = 2.0 \times 10^{-17} \text{ Ci/cm}^2/\text{sec}$$

If the $CO_2$ flow rate for flushing the wall were 1.05 liters/min. and if the net count rate measured by the detector were 75 c/m, the radon emanation rate is determined by multiplying 75 by $2.0 \times 10^{-17}$ Ci/cm$^2$/sec to give $1.5 \times 10^{-15}$ Ci/cm$^2$/sec.

The new detector has a number of advantages over existing means of measuring radon concentration. Its compact size and portability permit on-site measurements. The new detector measures radon directly, more quickly and simply without waiting for results. There is no complex calculation to arrive at the radon concentration. There is no sample handling and no complex recording of collection times. No waiting for decay of radon daughters is required because the radon daughters are removed from the detecting area by a unique method. Removal of the radon daughters removes the assumption that the radon daughters are in equilibrium. The radon collector is designed to collect only the radon emanating from the mine wall, which permits accurate measurement without contamination of radon by the mine air.

Obviously numerous modifications and variations of the present invention are possible in light of the above teachings. It is therefore to be understood that, within the scope of the appended claims, the invention may be practiced otherwise than as specifically described.

What is claimed as new and desired to be secured by Letters Patent of the United States is:

1. A direct measurement apparatus for radon comprising:
   a collector device attachable to a source of radon for collecting a sample of radon;
   a detector device for detecting the presence of and measuring the quantity of radon in a gaseous sample; and
   conduit means coupling said collector device and said detector device,
   said collector device including:
   a containment means positionable over a source of radon to contain a volume of radon;
   an attachment means for supporting said containment means to a source of radon; and
   transport means to carry said radon from said containment means;
   and said detector device including:
   a sample chamber to hold the radon-containing sample for radon detection and measurement;

a gas proportional counter to detect and register the presence of radon and means to remove the radioactive decay by-products or daughters of radon from said proportional counter.

2. The apparatus of claim 1 wherein said collector device further includes:

an inflatable diaphragm within said containment means to control the volume of the radon-containing sample; and means for inflating said diaphragm.

3. The apparatus of claim 2 wherein said transport means comprises a carrier gas introduced into said containment means for the removal of the radon sample from said collector device to said detector device via said conduit means.

4. The apparatus of claim 3 wherein said detector device further includes a filter for the removal of radon daughters prior to introduction of the radon sample into said sample chamber.

5. The apparatus of claim 4 wherein said sample chamber and said proportional counter are concentric and said proportional counter comprises:

a perforated cylinder;

a covering transparent to the passage of radon and surrounding said perforated cylinder to provide a fluid-tight volume within the cylinder;

an electrical anode within said cylinder;

dielectric end closures sealing said perforated cylinder and supporting said anode; and a power source connected to said anode.

6. The apparatus of claim 5 wherein the means to remove the radon daughters from said proportional counter comprises a film movable over the surface of said perforated cylinder, whereby movement of said film removes radon daughters thereon and away from said cylinder.

7. The apparatus of claim 6 wherein said dielectric end closures are provided with means for the intake and exhaust of a gas into and from the perforated cylinder.

8. The apparatus of claim 7 wherein said containment means comprises:

an enclosure having an open end positionable over a source of radon;

a cover closing the other end of said enclosure; and said inflatable diaphragm is positioned within said enclosure and when inflated said diaphragm substantially fills the volume of said enclosure, except for a residual volume adjacent the source of radon.

9. The apparatus of claim 8 wherein said containment means further includes transparent means in said closing cover to permit observation of the inner volume of said enclosure.

10. The apparatus of claim 9 wherein said movable film is unwound from a removable supply roll and wound onto a removable take-up roll to permit replacement of said film.

11. A collector device attachable to a source of gas for collecting a sample of the gas comprising:

a containment means having an open end portion positionable over the source of gas and a closed end portion;

an attachment means for supporting said containment means to the source of gas;

an expandable means within said containment means to control the containment volume of said containment means; and transport means to remove the sample gas from said containment means.

12. The collector device of claim 11 wherein the close end portion of said containment means includes transparent means to permit observation of the inner volume of said containment means.

13. The collector device of claim 12 wherein said expanding means includes:

an inflatable diaphragm within and positioned adjacent the closed end portion of said containment means; and means for inflating said diaphragm, whereby when inflated said diaphragm substantially fills the volume of said containment means, except for a residual volume adjacent the open end portion.

14. The collector device of claim 13 wherein said transport means comprises:

a second gas introduced into the volume between the inflatable diaphragm and the containment means; and conduit means for removing the mixture of the sample gas and the second gas from said containment means.

15. A detector device for detecting the presence of and measuring the quantity of radon in a gaseous sample comprising:

a sample chamber for holding the radon-containing sample during detection and measurement;

a gas proportional counter concentric with said sample chamber to detect and register the presence of radon; and means to remove the radioactive decay by-products or daughters of radon.

16. The detector device of claim 15 wherein said means to remove the radon daughters includes:

a filter for removing radon daughters from the gaseous sample; and a film movable over the surface of said gas proportional counter to remove the radon daughters from said counter.

17. The detector device of claim 16 wherein said movable film is unwound from a removable supply roll and wound onto a removable take-up roll to permit replacement of said film.

18. The detector device of claim 17 wherein said gas proportional counter includes:

a perforated cylinder;

a covering transparent to the passage of radon and surrounding said perforated cylinder to provide a gas-tight volume within the cylinder;

an electrical anode suspended within said cylinder;

dielectric end plugs sealing said perforated cylinder and supporting said anode; and a power source connected to said anode.

19. The detector device of claim 18 wherein said dielectric end plugs are provided with means for the intake and exhaust of a gas into and from said perforated cylinder.

20. A method of directly detecting and measuring radon comprising:

a. collecting a concentrated sample of radon;

b. removing the radioactive decay by-products or daughters of the radon sample;

c. introducing the sample into a radon detector having a gas proportional counter;

d. determining the quantity of radon in the sample; and e. continually removing the radon daughters while the radon quantity is being determined.

21. The method of claim 20 wherein the radon daughter removal of item (e) comprises continually passing a film over the gas proportional counter.

22. The method of claim 21 wherein the sample collection of item (a) comprises:
f. placing a containment means over the source of radon;
g. reducing the dead volume within the containment means to concentrate the radon sample; and
h. removing the sample from the containment means.

23. The method of claim 22 wherein the volume reduction of item (g) includes inflating a flexible means within the containment means.

24. The method of claim 23 wherein the sample removal of item (h) includes:
i. introducing a gas the dead volume of the containment means; and
j. conducting away the mixture of radon sample and gas.

25. The method of claim 24 wherein the removal in item (b) comprises passing the radon sample through a filter.

26. The method of claim 25 wherein the sample introduction of item (c) comprises introducing the filtered radon sample into a sample chamber concentric with and surrounding the gas proportional counter.

27. A method of collecting a radon gas sample comprising:
a. placing a containment means over a source of radon;
b. concentrating the radon gas sample; and
c. conducting the radon sample from the containment means.

28. The method of claim 27 wherein the sample concentration of item (b) includes inflating a flexible diaphragm within the containment means to decrease the dead volume between the diaphragm and the source of radon.

29. The method of claim 28 wherein the conduction of the radon sample of item (c) comprises:
d. introducing a gas into the dead volume; and
e. conducting the radon and gas mixture from the containment means.

30. A method of measuring radon comprising:
a. introducing a radon-containing sample into a sample-holding chamber;
b. measuring the alpha particle activity of the radon sample with a gas proportional counter concentric with the sample-holding chamber; and
c. continually removing the radioactive decay byproducts or daughters of radon to remove the effects of the daughters.

31. The method of claim 30 wherein the daughter removal of item (c) comprises continually passing a film over the gas proportional counter.

32. The method of claim 31 wherein the daughter removal of item (c) further comprises:
d. unrolling the film from a removable supply roll;
e. continually passing the film over the surface of the gas proportional counter; and
f. winding the film upon a removable take-up spool.

* * * * *